United States Patent [19]

Schruff

[11] Patent Number: 5,219,252
[45] Date of Patent: Jun. 15, 1993

[54] FIXING ELEMENT FOR FIXING A WORKPIECE ON A WALL HAVING AN OPENING

[76] Inventor: Herbert Schruff, Tannenweg 8, 5500 Trier, Fed. Rep. of Germany

[21] Appl. No.: 623,960

[22] Filed: Nov. 27, 1990

[30] Foreign Application Priority Data

Jul. 4, 1989 [DE] Fed. Rep. of Germany ... 8908137[U]

[51] Int. Cl.5 .................. F16B 13/04; F16B 39/00
[52] U.S. Cl. ........................... 411/34; 411/43; 411/55; 411/107; 411/183
[58] Field of Search ................. 411/34–38, 411/43, 55, 69, 70, 107, 183

[56] References Cited

U.S. PATENT DOCUMENTS

| | | | |
|---|---|---|---|
| 2,435,144 | 1/1948 | Kubicki | 411/34 |
| 2,887,926 | 5/1959 | Edwards | 411/38 |
| 3,304,830 | 2/1967 | Shackelford | 411/34 X |
| 4,036,098 | 7/1977 | Schruff | 411/34 |
| 4,182,216 | 1/1980 | DeCaro | 411/34 |
| 4,717,612 | 1/1988 | Shackelford | 411/34 |

Primary Examiner—Neill R. Wilson
Attorney, Agent, or Firm—Barnes, Kisselle, Raisch, Choate, Whittemore & Hulbert

[57] ABSTRACT

A fixing element for fixing in a through hole accessible only from one side comprises an upsettable sleeve with a flange-like end and an insert member which is disposed in the sleeve and which has a flange-like head, the outside diameter of which is substantially equal to the outside diameter of the sleeve, with the underside of the head of the insert member being connected to the adjoining end face of the sleeve by direct contact therewith for the transmission of pressure therebetween, The sleeve can be deformed to produce a bead-like configuration by a axial pulling from applied to the insert member. There is a material bonding connection such as spot welds between the outer periphery of the insert member and the inner periphery of the sleeve in the end region thereof. In the region of the connection the sleeve comprises a round shank portion while in its deformable region it has a portion of polygonal section.

6 Claims, 1 Drawing Sheet

Fig.1
Fig.2
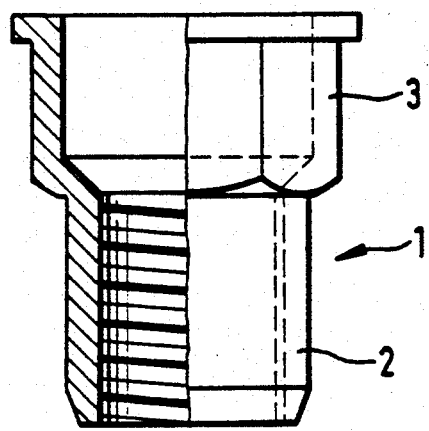
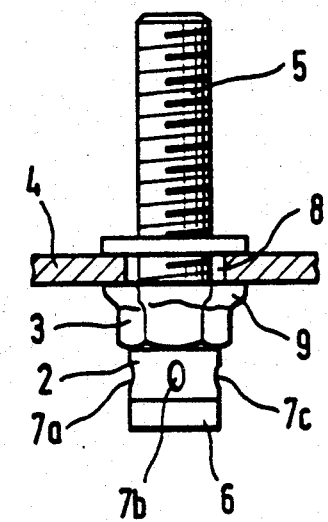
Fig.3
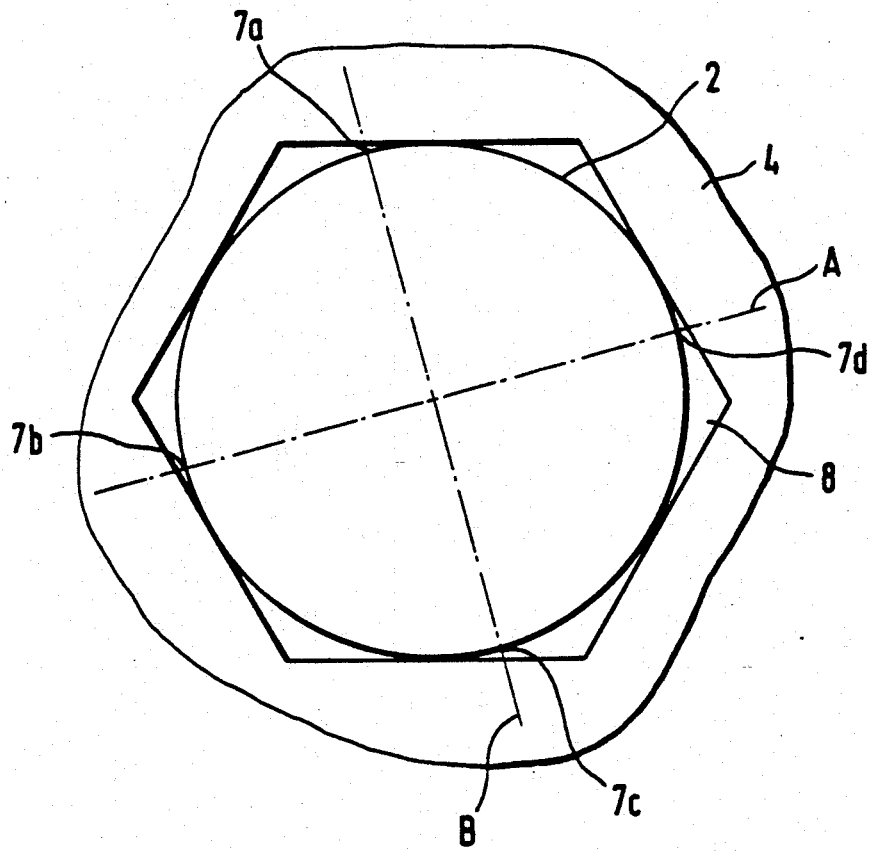

FIXING ELEMENT FOR FIXING A WORKPIECE ON A WALL HAVING AN OPENING

This application corresponds to International Patent Application PCT/EP90/01063 filed Jul. 3, 1990 and applicant claims the priority of the filing date thereof under 35 U.S.C. 120 and 35 U.S.C. 365 (c).

BACKGROUND OF THE INVENTION

There are many circumstances in which there is a need for a fixing element for fixing an article in position, more particularly in a through bore which is only accessible from one side of the structure to which the article is to be fixed. A fixing element of that kind, which is disclosed in German patent specification No. 2 520 586 comprises a cylindrical upsetting sleeve with an end of a flange-like configuration, and a cylindrical insert member which is disposed in the sleeve and which has a flange-like head, the outside diameter of which is equal to the outerside diameter of the upsetting sleeve. The underside of the head of the insert member is in direct contact against the adjoining end face of the sleeve, to provide for the transmission of pressure therebetween, and the upsetting sleeve is deformable in a bead-like configuration by virtue of an axial pulling force applied to the insert member. Between the outer periphery of the cylindrical insert member and the inner periphery of the sleeve, in the end region thereof, there is a material bonding connection providing a positive connection in respect of the materials involved. The connection may be in the form for example of spot welds.

Although that fixing element has enjoyed widespread use in practical situations it nonetheless suffers from a number of disadvantages. For example the fixing element is disposed in a round hole in the structure to which it is to be secured, and thus does not have any means for preventing rotation thereof. In addition the raised portions formed at the material bonding locations such as the spot welds referred to above mean that the structure to which the fixing element is to be fixed must have bores of enlarged size in order satisfactorily to accommodate the fixing element.

SUMMARY OF THE INVENTION

An object of the present invention is to provide a fixing element which does not suffer from the above-discussed disadvantages.

Another object of the present invention is to provide a fixing element for fixing in particular in a through bore which is only accessible from one side, which can be non-rotatably disposed in the workpiece to which it is to be fixed and in which the bore in the workpiece does not need to be larger than the outside diameter of the fixing element.

Still another object of the present invention is to provide a fixing element for fixing in a through bore which is accessible only from one side, which is quick and easy to fit while affording a secure and reliable connection.

In accordance with the principles of the present invention the foregoing and other objects are attained by a fixing element for fixing for example in a through bore which is accessible only from one side, comprising an at least substantially cylindrical upsettable sleeve having an end of a flange-like configuration and a cylindrical insert member adapted to be arranged in said sleeve and having a flange-like head, the outside diameter of which is at least substantially equal to the outside diameter of the sleeve. The underside of the head of the insert member bears directly against the adjoining end face of the sleeve for the transmission of pressure therebetween, and the sleeve is deformable to produce a bead-like configuration thereon by an axial pulling force applied to the insert member. There is a positive connection in respect of the materials involved, between the outer periphery of the insert member and the inner periphery of the sleeve in the end region thereof. The sleeve includes an at least substantially round shank portion in the region of said connection and is provided in the region of its deformation portion with a portion of polygonal section.

In a preferred feature of the invention the connection in respect of the materials involved, which can be referred to herein as the material bonding connection, comprises spot welding.

In another preferred feature of the invention, raised portions caused by the spot welding on the sleeve are adapted to be passed through a polygonal hole in the workpiece to which the fixing element is to be fixed, the hole corresponding to the polygonal portion of the sleeve, with the fixing element in a suitable rotational position.

In a preferred feature of the invention the outside periphery surface of the sleeve is in the form of a round shank portion in the region of the material bonding connection and in the form of a hexagon in the region of the deformation portion thereof. In that arrangement, the spot welds which are provided at four locations in two planes which extend in mutually perpendicular relationship can be passed through a hexagonal configuration, with the fixing element in a suitable rotational position.

It is preferable for the round shank portion of the sleeve to be at least between 3 and 3.5 mm in length while the axial extent of the hexagonal portion of the sleeve is about 3 mm thicker than the thickness of the material of the workpiece to which the fixing element is to be fixed.

A preferred feature of the invention provides that the insert member is in the form of a screwthreaded pin or bolt or a screwthreaded hollow cylinder member.

Further objects, features and advantages of the invention will be apparent from the following description of a preferred embodiment thereof.

BRIEF DESCRIPTION OF THE DRAWING

FIG. 1 is a view, partly in section, of an upsettable sleeve of the fixing element according to the invention, FIG. 2 shows the fixing element according to the invention with screwthreaded bolt when fixed in position to a workpiece, and FIG. 3 is an end view of the fixing element showing the rotational position of the round shank portion thereof in relation to a hexagonal hole in the workpiece.

DESCRIPTION OF THE PREFERRED EMBODIMENT

Referring firstly to FIG. 1, shown therein in partial section is an upsettable sleeve 1 of a fixing element according to the invention. As can be seen from FIG. 2, the fixing element is intended for fixing in particular in a through bore in a structure or workpiece 4, which bore is only accessible from one side.

The upsettable sleeve 1 has an end of a flange-like configuration, and comprises a round shank portion 2 and a hexagonal portion 3. Instead of comprising a hexagonal configuration, the portion 3 may also be of another polygonal configuration, corresponding to a polygonal hole in a workpiece 4 to which the fixing element is to be fixed.

As shown in FIG. 2 to which reference is now directed, disposed in the sleeve 1 is a cylindrical insert member having a flange-like head, illustrated in the form of a screwthreaded bolt 5 with a head as indicated at 6. The outside diameter of the head 6 is at least substantially equal to the outside diameter of the sleeve 1. The underside of the head 6, which faces upwardly in FIG. 2, is connected to the adjoining end face of the sleeve 1 by direct contact therewith, to permit the transmission of pressure therebetween, The sleeve 1 is thus deformable to produce a bead-like configuration as indicated at 9 in FIG. 2, by virtue of an axial pulling force applied to the bolt 5.

The above-mentioned round shank potion 2 of the sleeve 1 is provided in the region of a material bonding connection, involving a positive connection in respect of the materials involved, between the outer periphery of the bolt 5 and the inner periphery of the sleeve 1. The above-mentioned connection is afforded by spot welds indicated at 7a, 7b and 7c in FIG. 2, with a further spot weld being indicated at 7d in FIG. 3.

Referring now to FIG. 3, shown therein is the way in which the spot weld connections are provided at the four locations 7a through 7d in two planes indicated at A and B which extend in mutually perpendicular relationship. By virtue of the round shank portion 2 being rotated in relation to the hexagonal hole 8 in the workpiece 4 in the rotary position shown in FIG. 3, the four-point raised portions which occur at the spot weld locations 7a through 7d can pass through the hexagonal hole 8. That means that there is no need for the hole 8 to be larger than is required for securing the sleeve 1 of the fixing element in position.

As can also be seen from FIG. 2, after the insertion of the fixing element with the sleeve 1 and the screwthreaded bolt 5 secured therein, through the hexagonal hole 8 in the workpiece 4, and after an axial pulling force has been applied to the bolt 5, a bead configuration as indicated at 9 is produced in the hexagonal portion 3 in the region in which the sleeve 1 experiences deformation as a result of the pulling force applied to the bolt 5, whereby the fixing element is secured in position in the manner clearly shown in FIG. 2.

The round shank portion is of an axial length of at least between 3 and 3.5 mm, which is required in order to produce the spot weld connections 7a through 7d. There are not particular requirements in regard to the axial extent of the portion 3, as it generally depends on the thickness of the workpiece 4. In general the axial extent of the portion 3 of the sleeve 1 is about 3 mm greater than the thickness of the material of the workpiece 4.

Instead of the screwthreaded bolt 5 shown in FIG. 2, a screwthreaded hollow cylinder member may be fitted in the sleeve 1.

It will be seen from the foregoing that a fixing element in accordance with the invention has a means for preventing rotation thereof in the workpiece 4 in which it is to be secured, while in spite of the raised portions occurring on the round shank portion 2 as a result of the spot welding operation, the hole 8 in the workpiece 4 does not need to be substantially larger than the outside diameter of the sleeve 1, in order for the fixing element to be satisfactorily fitted into position.

It will be appreciated that the above-described embodiment of the fixing element in accordance with the principles of the invention has been set forth solely by way of example and illustration of the invention and that various other modifications and alterations may be made therein without thereby departing from the spirit and scope of the invention.

What is claimed is:

1. A fixing element particularly for fixing in through holes in workpieces accessible from only one side, comprising an at least substantially cylindrical upsettable sleeve or a flange-like configuration, and an at least substantially cylindrical insert member in said sleeve and having a flange-like head, the outside diameter of which is at least substantially equal to the outside diameter of the sleeve, the head of the insert member being in direct contact with the adjoining end face of the sleeve for the transmission of pressure therebetween, the sleeve being deformable to provide a bead-like configuration by an axial pulling force on the insert member, and further including a spot welding connection between the outer periphery of the insert member and the inner periphery of the sleeve in the end regions thereof, the sleeve comprising an at least substantially round shank portion in the region of said spot welding connection and a polygonal portion in the region of its bead-like deformation provided for inserting in a polygonal through-hole in the workpiece, wherein the raised portions caused by the spot welding on the sleeve are positioned such that the sleeve can pass through the polygonal hole in a workpiece corresponding to the polygonal portion when the fixing element is in suitable rotational position.

2. An element as set forth in claim 1 wherein spot welds are provided at first through fourth circumstantially spaced locations in first and second planes which extend in mutually perpendicular relationship with respect to the element.

3. An element as set forth in claim 1 wherein the round shank portion of the sleeve has an axial length of at least between 3 and 3.5 mm.

4. An element as set forth in claim 1 wherein the axial element of the hexagonal portion of the sleeve is about 3 mm greater than the thickness of the material of the workpiece to which the fixing element is to be fixed.

5. An element as set forth in claim 1 wherein the insert member is in the form of a screw threaded bolt.

6. An element as set forth in claim 1 wherein the insert member is a screw threaded hollow cylinder member.

* * * * *